United States Patent
Blum et al.

[19]

[11] Patent Number: 6,086,203
[45] Date of Patent: Jul. 11, 2000

[54] PROGRESSIVE ADDITION LENSES

[75] Inventors: Ronald D. Blum, Roanoke; Russell A. Chipman, Salem; Amitava Gupta; Edgar Vithal Menezes, both of Roanoke, all of Va.

[73] Assignee: Johnson & Johnson Vision Care, Inc., Jacksonville, Fla.

[21] Appl. No.: 09/146,888

[22] Filed: Sep. 3, 1998

[51] Int. Cl.[7] .................................................. G02C 7/06
[52] U.S. Cl. ........................ 351/169; 351/172; 351/177
[58] Field of Search .................................. 351/168, 169, 351/170, 171, 172, 177

[56]  References Cited

U.S. PATENT DOCUMENTS

| | | | |
|---|---|---|---|
| 3,711,191 | 1/1973 | Tagnon | 351/169 |
| 4,055,379 | 10/1977 | Winthrop | 351/169 |
| 4,056,311 | 11/1977 | Winthrop | 351/169 |
| 4,062,629 | 12/1977 | Winthrop | 351/169 |
| 4,253,747 | 3/1981 | Maitenaz | 351/169 |
| 4,461,550 | 7/1984 | Legendre | 351/169 |
| 4,806,010 | 2/1989 | Ewer et al. | 351/169 |
| 4,859,261 | 8/1989 | Ace | 156/102 |
| 4,906,090 | 3/1990 | Barth | 351/169 |
| 4,946,270 | 8/1990 | Guilino et al. | 351/169 |
| 4,952,048 | 8/1990 | Frieder et al. | 351/169 |
| 5,305,028 | 4/1994 | Okano | 351/169 |
| 5,771,089 | 6/1998 | Barth | 351/169 |
| 5,844,657 | 12/1998 | Shiraynagi | 351/169 |

FOREIGN PATENT DOCUMENTS

| | | |
|---|---|---|
| 809126 | 11/1997 | European Pat. Off. . |
| 809127 | 11/1997 | European Pat. Off. . |
| 414890 | 1/1998 | European Pat. Off. . |
| 63-254415 | 10/1988 | Japan . |
| 5303063 | 11/1993 | Japan . |
| WO 90/1238 | 10/1990 | WIPO . |
| WO 98/12591 | 3/1998 | WIPO . |
| 191831 | 5/1998 | WIPO . |
| WO 98/22848 | 5/1998 | WIPO . |

*Primary Examiner*—Scott J. Sugarman
*Attorney, Agent, or Firm*—Lois A. Gianneschi

[57]  ABSTRACT

The invention provides progressive addition lenses in which lens unwanted astigmatism is reduced and channel width through the intermediate and near vision zones is increased as compared to conventional progressive addition lenses. This result is achieved by combining a progressive addition surface with a first dioptric add power with at least one optical element that provides additional dioptric add power to the lens.

22 Claims, 9 Drawing Sheets

Distance from center of add zone (mm)

PROGRESSIVE ADDITION LENSES

FIELD OF THE INVENTION

The present invention relates to multifocal ophthalmic lenses. In particular, the invention provides progressive addition lenses in which unwanted lens astigmatism is reduced. At the same time, the channel width through the intermediate and near vision zones is increased as compared to conventional progressive addition lenses.

BACKGROUND OF THE INVENTION

The use of ophthalmic lenses for the correction of ametropia is well known. For example, multifocal lenses, such as progressive addition lenses ("PAL's"), are used for the treatment of presbyopia. The surface of a PAL provides far, intermediate, and near vision in a gradual, continuous progression of vertically increasing dioptric power from far to near focus, or top to bottom of the lens. PAL's are appealing to the wearer because PAL's are free of the visible ledges between the zones of differing dioptric power that are found in other multifocal lenses, such as bifocals and trifocals.

However, an inherent disadvantage in PAL's is unwanted lens astigmatism, or an astigmatism introduced or caused by one or more of the lens surfaces. Generally, unwanted lens astigmatism corresponds approximately to the near vision dioptric power of the lens. For example, a PAL with 2.00 diopter near vision power will have about 2.00 diopters of unwanted lens astigmatism. Additionally, the lens area free of unwanted astigmatism when the wearer's eye scans from the distance zone to the near zone and back is very narrow.

Any number of lens designs have been tried in attempting to overcome these disadvantages. However, although the state-of-the-art progressive lens designs provide some minimal decrease in unwanted lens astigmatism, large areas in the lenses' peripheries still are unusable due to unwanted astigmatism. Thus, a need exists for a PAL that overcomes some of the problems inherent in prior art PAL's.

BRIEF DESCRIPTION OF THE DRAWINGS

FIG. 9b is a power profile of the continuous element of the lens of FIG. 9a.

FIG. 10b is a power profile of the continuous element of the lens of FIG. 10a.

DESCRIPTION OF THE INVENTION AND ITS PREFERRED EMBODIMENTS

Figure 1:
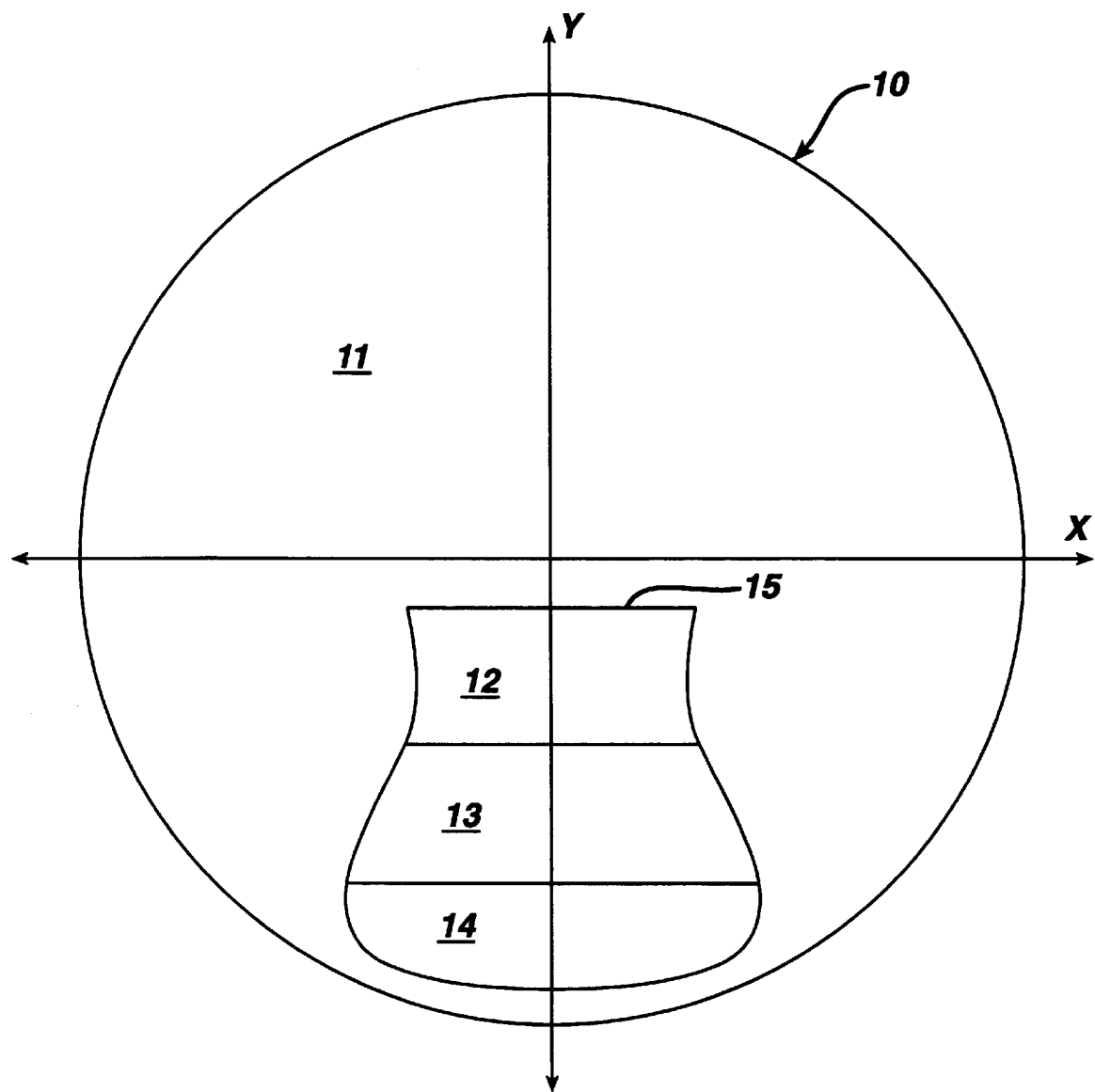
FIG. 1 is a front elevation view of an embodiment of the lens of the invention.

The present invention provides progressive addition lenses, as well as methods for their design and production, in which the unwanted lens astigmatism that is associated with a given near dioptric power is reduced compared to prior art lenses. Additionally, the minimum channel width of the lens of the invention is increased when compared to prior art PAL's.

For purposes of the invention, by "channel" is meant the optical zone that is free of unwanted astigmatism of about 0.75 diopters or greater, which connects the far vision zone with the near vision zone along the central umbilical meridian and is accessed by the wearer's eye when scanning from a far object to a near object and back. By "lens" or "lenses" is meant any ophthalmic lens including, without limitation, spectacle lenses, contact lenses, intraocular lenses and the like. Preferably, the lens of the invention is a spectacle lens.

It is a discovery of the invention that unwanted lens astigmatism may be reduced by combining a progressive addition surface with one or more optical elements. The optical elements provide additional dioptric power to the final lens in such a way that lens astigmatism is not increased to the level found in a conventional PAL. Further, the lens of the invention provides a minimum channel width that is increased when compared to those of current progressive addition lenses.

In one embodiment, the lens of the invention comprises, consists essentially of, and consists of: a.) an optical preform comprising, consisting essentially of, and consisting of a progressive addition surface having a near vision zone and a first dioptric add power; and b.) one or more continuous optical element having a second dioptric add power at least one of the one or more optical elements disposed so as to overlap the near vision zone and wherein the dioptric add power of the lens is the sum of the first and second dioptric add powers. By "optical preform" is meant any multifocal lens, such as a progressive addition lens, or optic. For purposes of the invention by "progressive addition surface" is meant a continuous, aspheric surface having far and near vision zones and a zone of increasing dioptric power connecting the far and near vision zones.

In another embodiment, the lens of the invention comprises, consists essentially of, and consists of: a.) an optical preform comprising, consisting essentially of, and consisting of a progressive addition surface having a near vision zone and a first dioptric add power; and b.) two or more discontinuous optical elements having a second dioptric add power at least one of the two or more discontinuous elements disposed so as to overlap the near vision zone and wherein the dioptric add power of the lens is the sum of the first and second dioptric add powers.

The progressive addition surface may be on the convex or concave surface of the optical preform or in a layer between the outer concave and outer convex surfaces of the lens. The curvature of the progressive surface increases in a positive manner from the far vision zone to the near zone. The dioptric add power of the progressive surface is the amount of dioptric power change between the far and near vision zones. The dioptric add power of the progressive addition surface used in the invention is selected to be of a value less than that needed to correct the lens wearer's near vision. The dioptric add power of the progressive surface may be from about +0.01 diopters to about +3.00 diopters, preferably from about +1.00 diopters to about +2.75 diopters.

The dioptric add power of the progressive surface is selected based on the total add power required for the finished lens in view of the maximum lens unwanted astigmatism associated with a given near dioptric power, the minimum channel width that is desired, and the ability to maintain a substantially cosmetically appealing lens. By "cosmetically appealing" is meant that the visibility of the optical elements of the lens are eliminated or minimized to a person viewing the lens wearer.

In order to obtain the total dioptric add power needed to correct for the wearer's presbyopia in the lens of the invention, at least one optical element is used that provides further dioptric add power to that provided by the progressive surface. The optical elements may be continuous, discontinuous, or a combination thereof. By "discontinuous" is meant either or both that a discontinuous changes exists in the sag value from the progressive surface to the element and from element to element or a change in the slope along the x and y axes with respect to the z axis exists from the progressive surface to optical element and from element to element. By "continuous" is meant that both the sag and slope of the element are substantially continuous or have less than or equal to about 0.00 to about 0.100 diopters, preferably less or equal to than about 0.00 to about 0.05 diopters, of discontinuity.

One ordinarily skilled in the art will recognize that the optical elements useful in the invention may be spheric, aspheric, or a combination thereof and of any convenient shape. Further, it will be recognized that use of either or both continuous and discontinuous elements will result in a lens with a continuous or discontinuous surface.

In embodiments in which discontinuous elements are used, two or more discontinuous elements are used which may be on the same surface as the progressive addition surface, on a surface opposite the progressive addition surface, in a layer between the progressive addition surface and the opposite surface, or any combination thereof. In embodiments in which continuous elements are used, one or more continuous elements are used which may be on a surface opposite the progressive surface, in a layer between the progressive surface and the opposite surface, or any combination thereof.

The optical element or elements, generally, are disposed so that the near vision zone of the progressive addition surface is overlapped by at least one of the optical elements. Preferably, at least one of the elements is disposed so that the center of the optical element coincides with the center of the near vision zone of the progressive addition surface. More preferably, at least one of the elements is disposed so that the center of the optical elements coincides with the center of the near vision zone and the center of the channel. For purposes of the invention, an element may overlap the near vision zone or coincide with the center of the near vision zone or channel without being on the same surface as the progressive addition surface.

In embodiments using discontinuous elements, a sag discontinuity may cause the appearance of a line across the lens, which may be cosmetically unappealing if its magnitude exceeds certain limits. A slope discontinuity causes image doubling or disappearance that may be functionally unacceptable if its magnitude exceeds certain limits. The surface with the sag discontinuity may be coated with one or more coatings to minimize the visibility of the line. Coatings suitable for such a purpose are any coatings for use in lenses and having refractive indices that are within 20 percent of the geometric mean of the refractive indices of the lens surface coated and air.

It is a discovery of the invention that the maximum range of sag discontinuities that can be obscured by coating application is about 0 to about 10 microns. Thus, the range of sag discontinuities for discontinuous elements used in the invention range from about 0 to about 10, preferably about 0 to about 5 microns. The sag discontinuity limit corresponds to an increase in dioptric power across an element of 12 mm in length that is about 0 to about 0.125 diopters, preferably about 0 to about 0.065 diopters. As to slope discontinuity, the maximum range of slope discontinuities has been discovered to correspond to an increase in dioptric power of about 0 to about 0.25 diopters, preferably about 0 to about 0.125 diopters.

In view of these limits, it has been discovered that it is preferable to use at least two, preferably about 2 to 5 discontinuous optical elements to obtain the desired increment of dioptric add power. As to spacing of the elements, slope discontinuities lead to image doubling that creates unwanted astigmatism, the magnitude of which is proportional to the slope discontinuity magnitude and the spacing between the discontinuous optical elements. The less spacing between the elements, the greater the number of images captured by a pupil scanning the optic.

For example, if the discontinuous elements are 2 mm apart, a 5 mm diameter pupil will capture up to four images at the same time. The additional astigmatism associated with image blurring may be minimized if the number of images captured by the 5 mm pupil is kept to 2. Thus, preferably the discontinuous elements are about 3 to about 18 mm apart, preferably about 5 to about 15 mm apart. For such spacing, its has been discovered that the astigmatism associated with a 0.08 diopter slope discontinuity decreases to below 0.05 diopters and image doubling is below the perceptible level for the optic wearer. In cases in which a higher level of image blurring or astigmatism is tolerable, the spacing of elements may be closer Each discontinuous optical element may be of the same or, preferably, of a different dioptric power. In embodiments using discontinuous elements, preferably two or more elements are used and the dioptric power changes as one moves from a first to a second to a third element, and so forth. However, the increase in power from element to element, preferably, is such that the wearer's perception of the change in dioptric power is minimized or eliminated. Generally, the change in dioptric power moving from element to element is less than about 1.50 diopters, preferably less than about 0.50 diopters, more preferably less than about 0.37 diopters, and most preferably less than about 0.25 diopters.

The dioptric power for each element is determined by the radius of curvature of the element, dioptric power increasing as the curvature of the element is decreased. Thus, each element may provide additional dioptric add power to the optical preform ranging from about +0.01 diopters to about +3.00 diopters, preferably from about +0.01 to about +2.00 diopters, more preferably from about +0.01 to about +0.50 diopters, most preferably from about +0.03 to about +0.25 diopters. The dioptric add power for the optical element is the incremental add power provided by the element, which power one ordinarily skilled in the art will be readily able to determine.

For example, in FIG. 1, the change in dioptric power from element to element is 0.25 diopters and the dioptric power of the elements is +0.25 diopters for the uppermost element 12, +0.50 diopters for the second element 13, and +0.75 diopters for the third element 14. Thus, the dioptric add power of the optical elements is +0.75 diopters. As another example, in FIG. 2, the dioptric power of the concave surface elements 22, 23, and 24 is +0.25, +0.50, and +0.75, respectively and that of the convex surface elements 25 and 26 is +0.12 and +0.24 diopters, respectively. Therefore, the total dioptric add power of the elements of the lens is +0.99 diopters. In the lens of the invention, the dioptric add power of the elements may range from about +0.01 to about +3.00 diopters, preferably about +0.25 to about +2.00 diopters.

In embodiments of the lens of the invention in which the increase in power between optical elements results in sag discontinuities across the channel, preferably, the sag discontinuity is set to about 0 microns in the middle of the channel by adjusting the relative heights of the elements. The overall sag discontinuity along the vertical lines of the elements may be reduced by introducing a very small angle, the segment angular discontinuity, at the horizontal segment boundaries.

Figure 6:
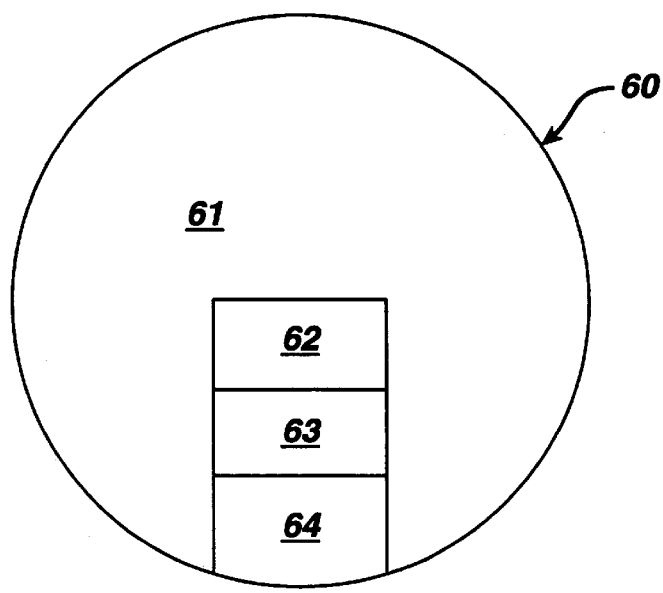
FIG. 6 is a front elevation view of an embodiment of the lens of the invention.
Figure 7:
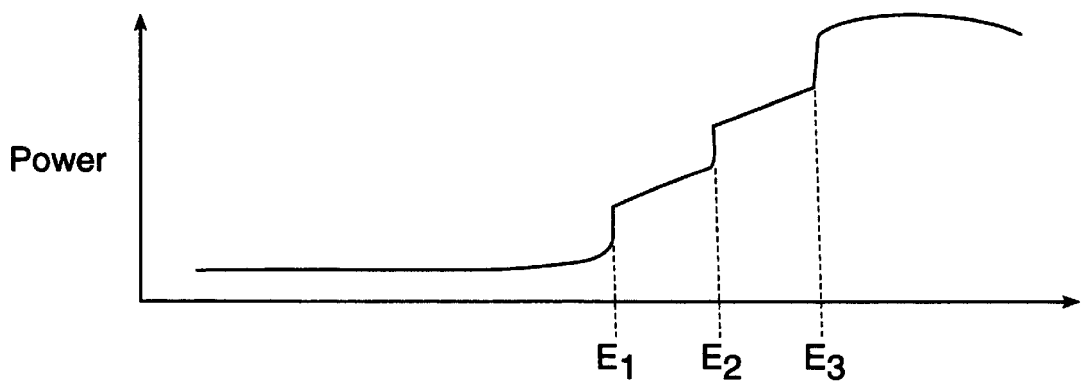
FIG. 7 is a power profile of the lens of FIG. 6.

The location and geometry of the elements may be specified by any known technique. For example, location and geometry may be evaluated, designed, and specified using ray tracing or measured test results on lenses. Additionally, the surfaces bound by the elements may be optimized by any known process for best imaging performance. For example, such optimization may be performed using commercially available optical design software, In FIG. 6 is depicted one preferred embodiment of the location of the discontinuous optical elements used in the lens of the invention. Distance viewing zone 61 is shown along with discontinuous optical elements 62, 63, and 64. In this embodiment, the optical elements are aligned so that their centers coincide with the center of the channel and the near vision zone of the progressive addition to surface, which surface and zone is not shown in FIG. 6. The progressive addition surface has a dioptric add power of +1.25 diopters and the optical elements a dioptric add power of +0.75 diopters. The power profile for the FIG. 6 embodiment is depicted in FIG. 7, with points $E_1$, $E_2$, and $E_3$ corresponding to elements 62, 63, and 64, respectively. The sloping increase in power is due to the +1.25 dioptric add power of the progressive surface and the steps at points, $E_1$, $E_2$, and $E_3$ are caused by the change in curvature of the discontinuous elements.

Figure 2:
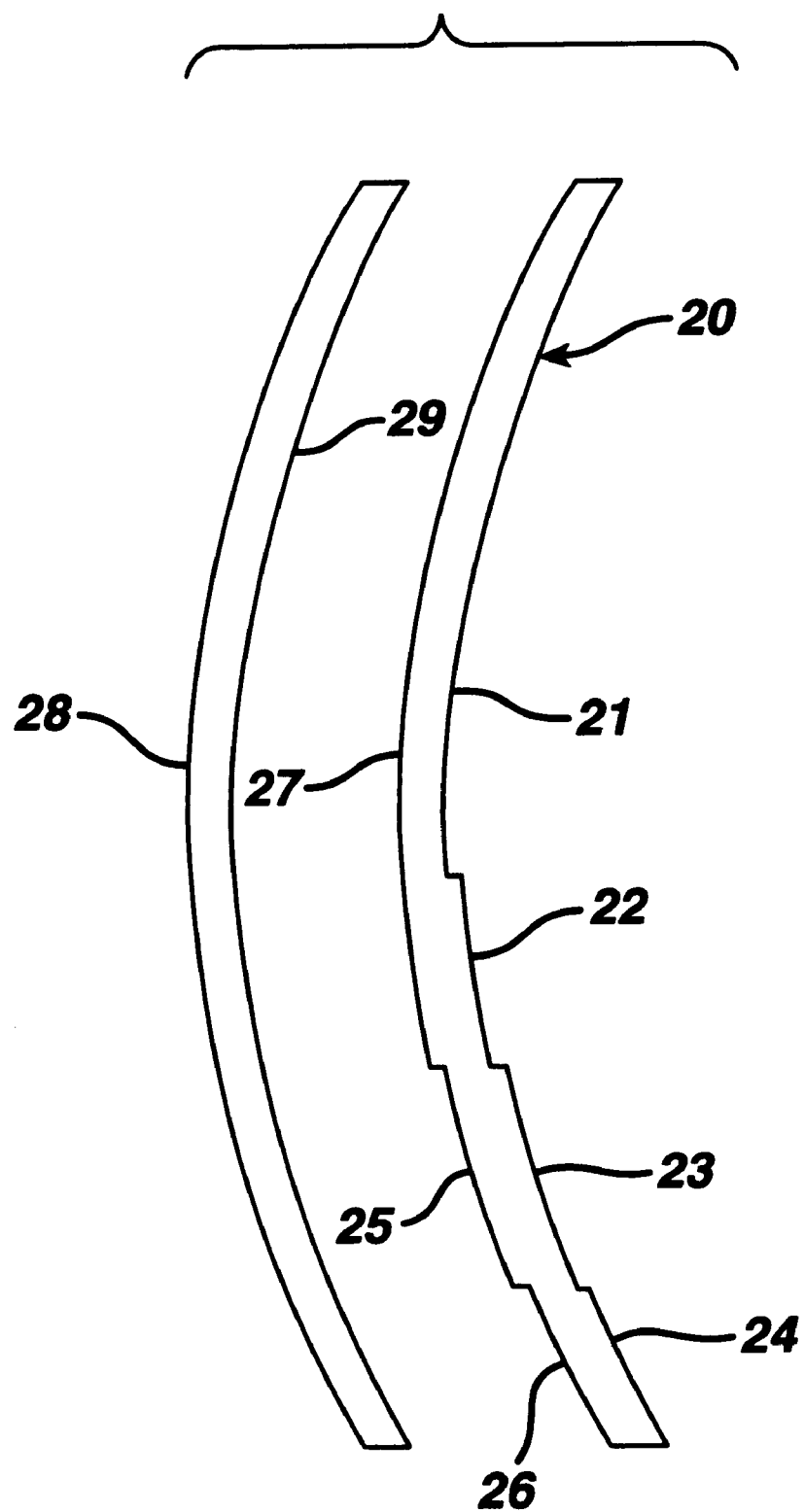
FIG. 2 is an exploded side view of an embodiment of the lens of the invention.
Figure 3:
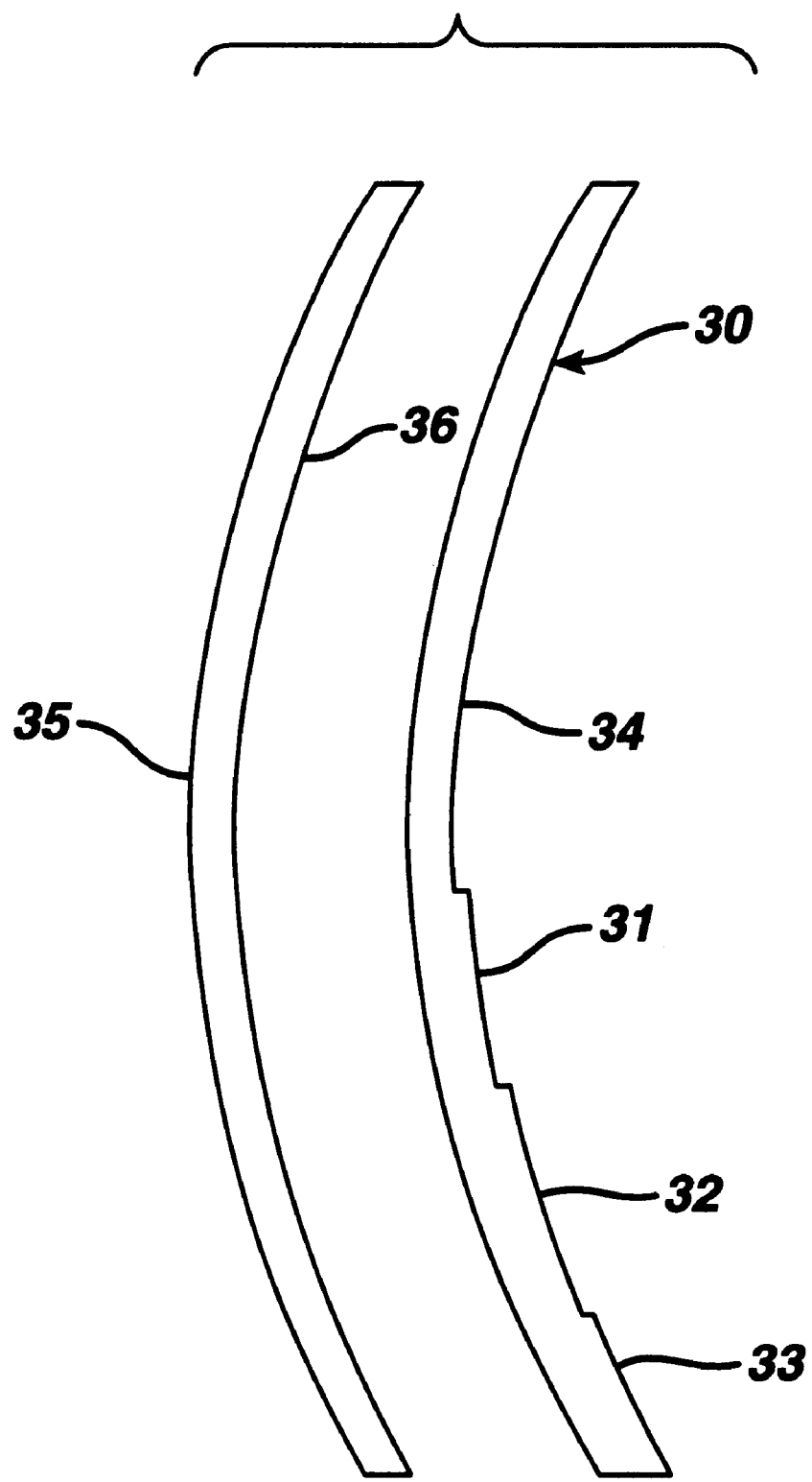
FIG. 3 is an exploded side view of an embodiment of the lens of the invention.
Figure 5:
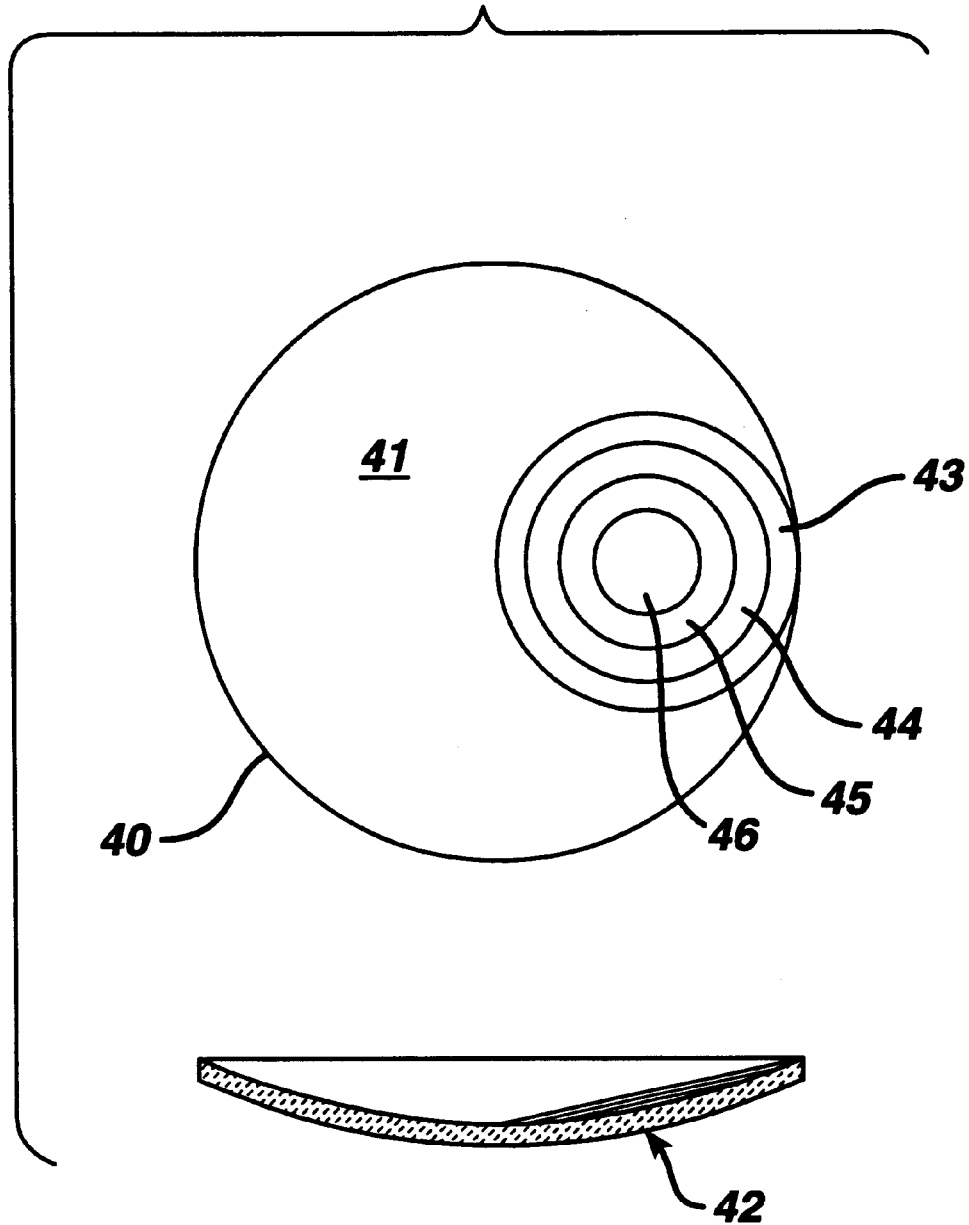
FIG. 5 is a back elevation and side view of an embodiment of the lens of the invention.

FIGS. 2, 3 and 5 illustrate two shapes useful for the discontinuous optical elements of the invention, a step shape and a circular "bulls-eye" shape. The elements may be formed by any known method. Suitable methods include, without limitation, grinding, molding, casting, diamond tooling, milling, polishing, thermoforming, or a combination thereof In addition to the optical elements and progressive surface, other surfaces, such as spheric and toric surfaces, designed to adapt the lens to the ophthalmic prescription of the lens' wearer may be used.

In one embodiment of the invention, as depicted in FIG. 2, the concave surface 21 of optical preform 20 is a progressive addition surface with an add power of +1.00 diopters. Discontinuous, aspheric optical elements 22, 23, and 24 are placed on concave surface 21 and elements 25 and 26 on convex surface 27. In this embodiment, and preferably, the upper boundary of the topmost convex surface element 25 is aligned with the bottom boundary of the topmost concave surface element 22. In FIG. 2, the dioptric power of elements 25 and 26 are +0.12 and +0.24 diopters, respectively, and that of the elements 22, 23, and 24 are +0.25, +0.50, and +0.75 diopters, respectively. Therefore, the total add power for the lens will be (+0.24 diopters)+(+0.75 diopters)+(+1.00 diopters) or +1.99 diopters. In the embodiment depicted in FIG. 2, toric surface 28 is cast onto convex surface 27 of the optical preform to provide the final desired lens. In such an embodiment, in which either the concave or convex surface is provided with a toric correction, preferably, at least one intermediate layer 29 is provided in the lens that is spherical in geometry.

As to FIG. 2, because only the +1.00 dioptric add power of the optical preform's progressive addition surface contributes to the lens astigmatism, the +1.99 dioptric add power of the lens is achieved with introduction of less lens astigmatism than that formed in a conventional +1.99 add PAL. For a prior art PAL, with a +1.99 add, the lens astigmatism would result in approximately +1.99 diopters of lens astigmatism. Therefore, lens astigmatism of the lens of the invention of FIG. 2 is reduced as compared to a prior art progressive lens. Further, the channel through the intermediate and near vision zones of the lens is increased in width.

In the embodiment depicted in FIG. 2, optical elements 25 and 26 are buried within the lens in a layer between the convex and concave surfaces of the lens. In this embodiment, preferably, the surface with the buried elements is of a different refractive index than the toric surface 29. The difference in the surfaces' refractive indices is about 0.05 to about 0.50, preferably about 0.1 to about 0.35.

Preferably, a majority, or all as depicted in FIG. 3, of the elements 31, 32, and 33 are located on concave surface 34 of optical preform 30, which surface is also the concave surface of the lens shown, or in a layer between the concave surface 34 and convex surface 35 of the final lens. In an alternative preferred embodiment, the elements are located on the concave lens surface and in a layer between the concave and convex surfaces of the lens. In such embodiments, preferably, the surfaces or layers containing the optical elements are of different refractive indices than those surfaces or layers without the optical elements. The reason that such placement is preferred is that it provides a more cosmetically appealing lens in that the visibility of the elements to one viewing the lens wearer is eliminated or minimized.

Referring to FIG. 1, another embodiment of the lens of the invention is shown. The y axis of lens 10 represents the principal meridional line bisecting lens 10 in a generally vertical direction. The x axis represents the y=0 line of lens 10. Distance viewing zone 11 is shown. A progressive surface, with a dioptric add power +1.00 and which underlies optical elements 12, 13, and 14, is not shown. The change in dioptric power between elements 12 and 13 and 13 and 14 is 0.25 diopters. The dioptric power of element 12 is +0.25, of element 13 is +0.50, and of element 14 is +0.75 diopters. The total dioptric add power of lens 10, thus, is +1.75 diopters.

The uppermost boundary of the optical elements may be located on or below the y=0 line, or the 0–180 degree line. Generally, the optical elements are positioned such that the upper edged of the element or elements is located between about 0 and about 18.5 mm and the lower edge of the element or elements is located between about 5 to about 35 mm below the y=0 line. FIG. 1 depicts a preferred embodiment, the uppermost boundary of the optical elements being located below about 2 mm below the y=0 line of the lens.

Figure 4:
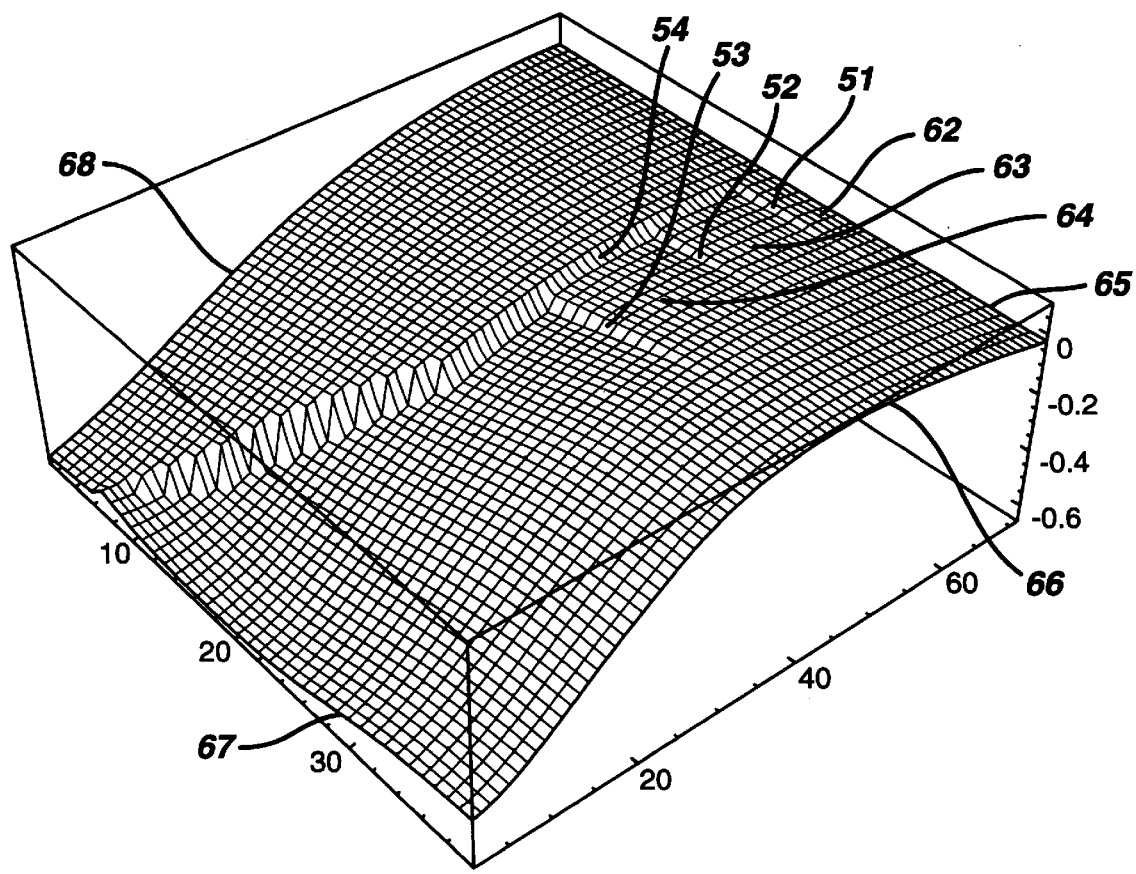
FIG. 4 is a schematic diagram depicting a portion of a surface of the lens of FIG. 6.

FIG. 4 is a schematic view of the surface topography of the lower left quadrant of the lens of FIG. 6. Horizontal line 65, a cut through the middle of lens 60 at y=0, mid channel 66, bottom edge 67, and peripheral edge 68 of the lens are shown. From FIG. 4, it is seen that the discontinuous elements 62, 63, and 64 have significantly different curvatures from the surrounding lens areas and from each other. These elements are designed so that the sag is continuous along the y axis. However, due to the different curvatures of the elements, a sag discontinuity increases approximately quadratically away from the y axis and is seen as horizontal discontinuities 81, 82, and 83. To the left of elements 62, 63, and 64 is seen vertical discontinuities, such as vertical discontinuity 84.

To reduce the vertical discontinuities, segment angular discontinuities are introduced into the lens, the function of which is to reduce the magnitude of the vertical discontinuities, such as 84. The segment angular discontinuity between distance zone 61 and element 62 is 0.001 radians and that between elements 62 and 63 is 0.0025 radians. No segment angular discontinuity exists between elements 63 and 64. The segment angular discontinuities are not sufficiently large to be depicted in FIG. 4.

The horizontal and vertical discontinuities may provide practical limits to the width of the discontinuous elements useful in the invention. For a given discontinuity in power, the horizontal sag discontinuity increases in a quadratic function, such as $x^2$, away from the channel. Thus, if the horizontal sag discontinuity is to be kept below a desired specified value, this condition will place a limit on the width of the discontinuous element. Similar consideration will apply to the vertical discontinuities as well as the prism introduced by the discontinuities.

In FIG. 5 is illustrated yet another embodiment of the lens of the invention. Concave surface 41 of optical preform 40 and convex surface 41 are shown. Convex surface 42 is a progressive surface of a 1.50 dioptric add power. Optical elements 43–46 are provided being +0.725, +1.45, +2.175, and +2.90 diopters, respectively. The elements are spaced 4 mm apart. Each element has a circular section formed by the intersection of two spheres of two different radii of curvature. For example, element 43 is formed by the intersection of the surface base sphere, 41 83.00 mm) and a sphere of radius 92.4 mm. Because the optical element provides an incremental add power on the concave surface 41, the curvature is flatter, i.e., the radius of curvature of the element is larger than that of the base sphere. Similarly, element 44 is a second circular section concentric with element 43 and formed by the intersection of the sphere of radius 92.4 mm with a third sphere of radii of curvature equal to 105.6 mm. Thus, the discontinuous elements of FIG. 5 are arranged in the form of a nested set of spherical sections the radii of which are collinear. The refractive index of optical preform 40 is 1.586. Optical elements 43–46 are formed in optical preform 40. A layer will be cast onto the concave surface 41 of optical preform 40. The refractive index of this cast layer will differ from that of optical preform 40 by 0.1 units.

In such a case, the dioptric power of the optical elements will be affected as follows. The dioptric power of each optical element will be scaled by dividing the dioptric power for a given element by x, where:

$$x = \frac{n_1 - 1.00}{n_1 - n_2}$$

wherein $n_1$ is the refractive index of the optical preform and $n_2$ is the refractive index of the cast layer. For FIG. 5:

$$x = \frac{1.586 - 1.00}{0.1} = 5.86$$

For element 43, having a dioptric power of +0.725 diopters, 0.725 divided by 5.86 equals a dioptric power of +0.125 diopters for element 43. The dioptric add power of the optical elements is +0.50 diopters, making the total dioptric add power of the FIG. 5 lens +2.00 diopters.

Figure 8:
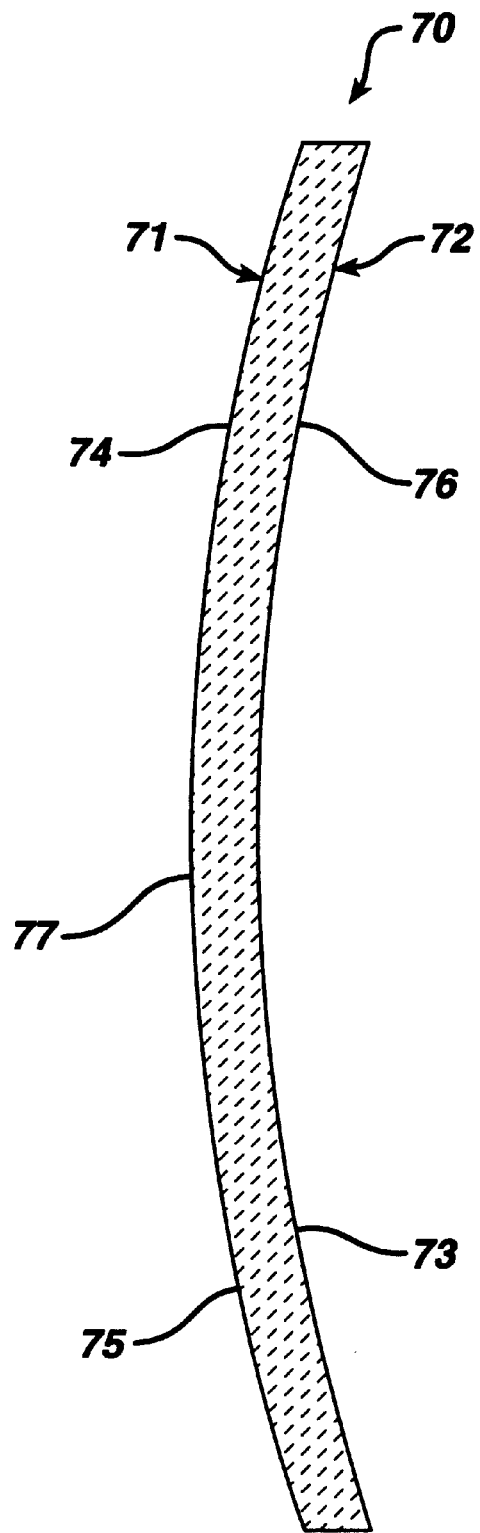
FIG. 8 is side view of an embodiment of the lens of the invention.

In FIG. 8 is depicted an embodiment of the lens of the invention in which continuous elements are used. Optical preform 70 is shown with progressive addition convex surface 71 with a distance viewing zone 74, near viewing zone 75 and intermediate zone 77. The dioptric add power of the progressive surface is +1.60 diopters. Concave surface 72 is shown with a spherical zone 76 and continuous optical elements 73 located orthogonal to zone 75. The dioptric add power of the optical elements 73 is +0.40 diopters. Convex surface 71 has a curvature of 4.50 diopters in zone 74 and a curvature of 6.10 diopters in zone 75. Concave surface 72 has a curvature of 4.50 diopters in zone 76 and 4.10 diopters at 73. The resulting lens has a dioptric add power of +2.00 diopters, the sum of the dioptric add powers of the progressive addition surface and that of continuous optical element 73.

Figure 9A:
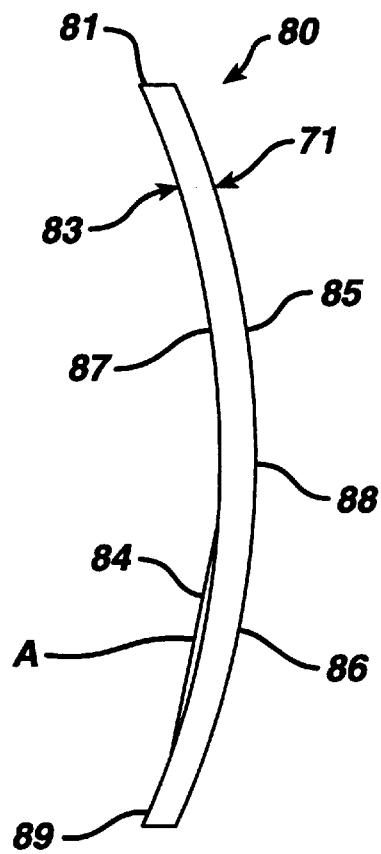
FIG. 9a is a side view of an embodiment of the lens of the invention.
Figure 9B:
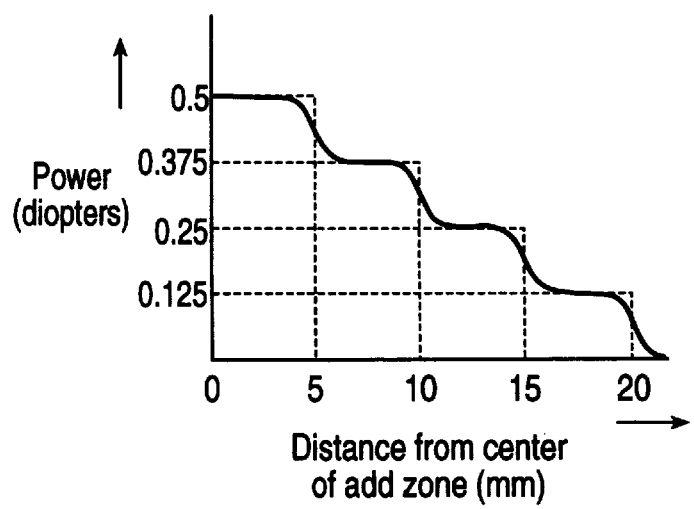

FIG. 9a and FIG. 9b depict yet another embodiment of the lens of the invention using continuous optical elements. Lens 80 is shown having optical preform 81 with convex surface 82, a progressive surface, having distance viewing zone 85, near viewing zone 86, and intermediate zone 88 of continuously increasing dioptric power. Concave surface 83 has spherical zone 87, a distance viewing zone. Continuous optical element 84 is located orthogonal to near viewing zone 86. Continuous element 84 is a progressively changing dioptric power between zone 87 and the edge 89 of the preform. Convex surface 82 has a curvature of 4.50 diopters in zone 85 and 6.00 diopters in zone 86. Concave surface 83 has a curvature of 4.50 diopters in zone 86 and 4.00 diopter at point A, the central point of element 84. The resulting lens has a dioptric add power of 2.00 diopters. In FIG. 9b is shown the power profile of optical element 84. The solid line depicts the power profile of element 84 compared to a profile of discontinuous, concentric elements shown as the dotted line.

FIG. 9b depicts the blended concentric power profile of element 84. This profile has zones of constant power that are smoothly connected to each other by aspheric or blended radii or curvature. This blending results in a continuous sag radius, and power profile across the element.

Figure 10A:
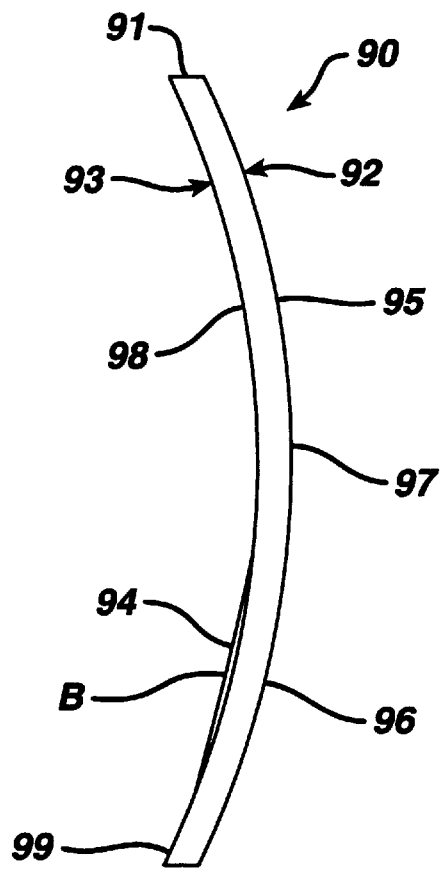
FIG. 10a is a side view of an embodiment of the lens of the invention.
Figure 10B:
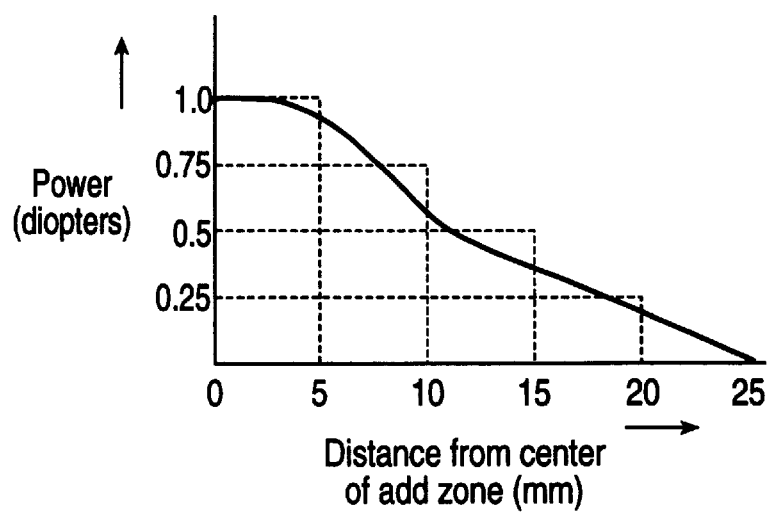

FIG. 10a and FIG. 10b depict still another embodiment of a lens of the invention using continuous elements. Lens 90 is shown having optical preform 91 with convex surface 92. Convex surface 92 has distance viewing zone 9, near viewing zone 96 and an intermediate zone 97 of progressively increasing dioptric power. Concave surface 93 has distance viewing zone 98 and continuous optical element 94 orthogonal to near viewing zone 96. The continuous element 94 is of a progressively changing dioptric power between zone 98 and edge 99.

Convex surface 92 has a curvature of 4.50 diopters in zone 95 and 5.50 diopters in near zone 96. Concave surface 93 has a curvature o 4.50 diopters in zone 98 and 3.50 at point B, the center of zone 94. Lens 90, thus, has a dioptric add power of 2.00 diopters. FIG. 10b depicts the power profile of lens 90 as a solid line compared to discontinuous, concentric optical elements.

FIG. 10b depicts an aspheric power profile for the continuous element. In this profile, there is not point at which he radius of curvature is a constant, but rather the radius changes smoothly from the center of the element to its edge. For the embodiment depicted in FIG. 10a, and as seen in FIG. 10b, the power profile intersects the reference discontinuous concentric profile at the mid-point of each concentric zone.

What is claimed is:

1. A lens comprising:
   a.) an optical preform comprising a progressive addition surface having a near vision zone and a first dioptric add power; and
   b.) one or more continuous optical elements having a second dioptric add power at least one of the one or more continuous optical elements disposed so as to overlap the near vision zone
   wherein the dioptric add power of the lens is the sum of the first and second dioptric add powers.

2. The lens of claim 1 wherein the lens is a spectacle lens.

3. The lens of claim 1, further comprising two or more discontinuous elements having a third dioptric add power, at least one of the two or more discontinuous optical elements disposed so as to overlap the near vision zone wherein the dioptric add power of the lens is the sum of the first, second, and third dioptric add powers.

4. The lens of claim 1 wherein the near vision zone of the optical preform progressive addition surface further comprises a center, the one or more continuous optical elements further comprises a center, and the center of at least one of the one or more continuous optical elements is disposed so that it coincides with the center of the near vision zone.

5. The lens of claim 1 wherein the one or more continuous optical elements is on a surface opposite the progressive addition surface, in a layer between the progressive addition surface and the surface opposite the progressive addition surface, or a combination thereof.

6. The lens of claim 3 wherein the one or more continuous optical elements is on a surface opposite the progressive addition surface, in a layer between the progressive addition surface and the surface opposite the progressive addition surface, or a combination thereof and the two or more discontinuous optical elements are on the progressive surface, a surface opposite the progressive addition surface, in a layer between the progressive addition surface and the surface opposite the progressive addition surface, or a combination thereof.

7. The lens of claim 1 wherein the dioptric add power of the optical preform is about +0.01 to about +3.00 diopters and the dioptric add power of the one or more continuous optical elements is about +0.01 to about +3.00 diopters.

8. The lens of claim 3 wherein the dioptric add power of the optical preform, the one or more continuous optical elements and the two or more discontinuous optical elements are each independently about +0.01 to about +3.00 diopters.

9. A spectacle lens comprising:
   a.) an optical preform comprising a progressive addition surface having a near vision zone having a center, the progressive addition surface having a dioptric add power of about +1.00 to about +2.75 diopters; and
   b.) one or more continuous optical elements having a center and a dioptric add power of about +0.25 to about +2.00, at least one of the one or more continuous optical elements disposed so that the center of the element coincides with the center of the near vision zone and the one or more continuous optical elements is on a surface opposite the progressive addition surface, in a layer between the progressive addition surface and the surface opposite the progressive addition surface, or a combination thereof
   wherein the dioptric add power of the lens is the sum of the first and second dioptric add powers.

10. The lens of claim 9, further comprising two or more discontinuous optical elements having a center and a third dioptric add power of about +0.25 to about +2.00 wherein at least one of the two or more discontinuous optical elements is disposed so that its center coincides with the center of the near vision zone and
wherein the dioptric add power of the lens is the sum of the first, second, and third dioptric add powers.

11. The lens of claim 10, wherein the two or more discontinuous optical elements are located on the progressive addition surface, a surface opposite the progressive addition surface, in a layer between the progressive addition surface and the surface opposite the progressive addition surface, or a combination thereof.

12. A lens comprising:
   a.) an optical preform comprising a progressive addition surface having a near vision zone and a first dioptric add power; and
   b.) two or more discontinuous optical elements having a second dioptric add power, at least one of the two or more discontinuous optical elements disposed so as to overlap the near vision zone
   wherein the dioptric add power of the lens is the sum of the first and second dioptric add powers.

13. The lens of claim 12 wherein the lens is a spectacle lens.

14. The lens of claim 12, further comprising one or more continuous optical elements having a third dioptric add power at least one of the one or more continuous optical elements disposed so as to overlap the near vision zone, wherein the dioptric add power of the lens is the sum of the first, second, and third dioptric add powers.

15. The lens of claim 12 wherein the near vision zone of the progressive surface further comprises a center, the two or more discontinuous optical elements further comprise a center, at least one of the two or more discontinuous optical elements disposed so that its center coincides with the center of the near vision zone.

16. The lens of claim 12 wherein the two or more discontinuous optical elements is on the progressive addition surface, a surface opposite the progressive addition surface, in a layer between the progressive addition surface and the surface opposite the progressive addition surface, or a combination thereof.

17. The lens of claim 14 wherein the one or more continuous optical elements is on a surface opposite the progressive addition surface, in a layer between the progressive addition surface and the surface opposite the progressive addition surface, or a combination thereof and the two or more discontinuous elements are on the progressive surface, a surface opposite the progressive addition surface, in a layer between the progressive addition surface and the surface opposite the progressive addition surface, or a combination thereof.

18. The lens of claim 12 wherein the dioptric add power of the optical preform, and the two or more discontinuous optical elements is each independently about +0.01 to about +3.00 diopters.

19. The lens of claim 14 wherein the dioptric add power of the optical preform is about +0.01 to about +3.00 diopters and the dioptric add powers of the one or more continuous optical elements and the two or more discontinuous elements are each independently about +0.01 to about +3.00 diopters.

20. A spectacle lens comprising:
   a.) an optical preform comprising a progressive addition surface having a near vision zone having a center, the progressive surface having a dioptric add power of about +1.00 to about +2.75 diopters; and b.) two or more discontinuous optical elements having a center and a dioptric add power of about +0.25 to about +2.00, the center of at least one of the two or more discontinuous optical elements disposed so as to coincide with the center of the near vision zone and the two or more discontinuous optical elements are located on the progressive surface, a surface opposite the progressive addition surface, in a layer between the progressive addition surface and the surface opposite the progressive addition surface, or a combination thereof wherein the dioptric add power of the lens is the sum of the first and second dioptric add powers.

21. The lens of claim 20, further comprising one or more continuous optical elements having a third dioptric add power of about +0.25 to about +2.00 wherein the dioptric add power of the lens is the sum of the first, second, and third dioptric add powers.

22. The lens of claim 20, wherein the one or more continuous optical elements is located on a surface opposite the progressive addition surface, in a layer between the progressive addition surface and the surface opposite the progressive addition surface, or a combination thereof.

* * * * *